O. SERPEK.
PROCESS OF REMOVING IMPURITIES FROM IMPURE ALUMINOUS MATERIAL AND PRODUCING NITROGEN COMPOUNDS THEREFROM.
APPLICATION FILED MAY 12, 1910.
1,016,526.
Patented Feb. 6, 1912.
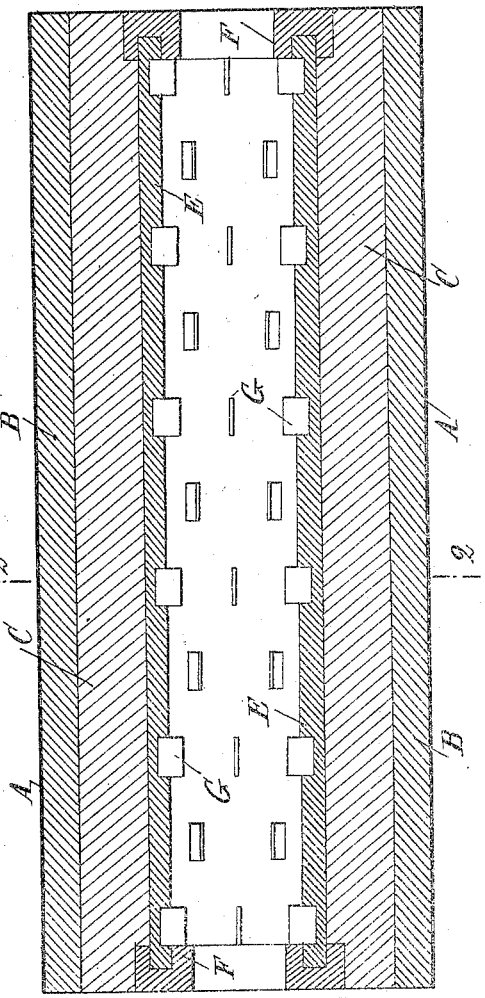
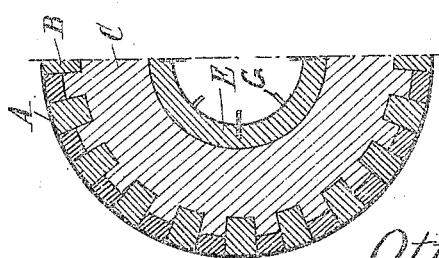
Witnesses.
M. Lefting
D. E. Burdine
Inventor:
Ottokar Serpek
by B. Singer,
Att'y.

UNITED STATES PATENT OFFICE.

OTTOKAR SERPEK, OF ZURICH, SWITZERLAND.

PROCESS OF REMOVING IMPURITIES FROM IMPURE ALUMINOUS MATERIAL AND PRODUCING NITROGEN COMPOUNDS THEREFROM.

1,016,526.

Specification of Letters Patent.

Patented Feb. 6, 1912.

Application filed May 12, 1910. Serial No. 560,917.

*To all whom it may concern:*

Be it known that I, OTTOKAR SERPEK, a subject of the Austro-Hungarian Emperor, residing at 45 Tödistrasse, Zurich, Switzerland, have invented new and useful Improvements in Processes of Removing Impurities from Impure Aluminous Material and Producing Nitrogen Compounds Therefrom, of which the following is a specification.

I have discovered that when impure aluminous material such as bauxite is mixed with carbon and the mixture heated in the presence of nitrogen, the impurities contained in the aluminous material, especially silica, alkaline earths and alkalis, can be vaporized, and that this evaporation takes place at temperatures below those which are necessary for vaporizing or even melting alumina. Thus at 1600° C. the impurities may be removed by passing the nitrogen rather quickly through the mass. At this temperature the formation of aluminum nitrid begins to take place.

In order that the reaction may be quickly and thoroughly effected, temperatures of 1700 to 1800° C. are sufficient. (The temperatures are uniformly determined by means of Wanner's optical pyrometer). A further increase of the temperature accelerates the evaporation and the formation of nitrid, without in any way substantially altering the invention. The temperature may without hesitation be increased considerably, as the nitrid is scarcely volatile even in the electric arc, so that there can be no loss of nitrid. According to the period of the heating and the degree of the temperature, nitrids are obtained, which contain up to 34% of nitrogen, and thus may be regarded as chemically pure. By treating such pure nitrids with water under pressure, pure alumina is obtained with ammonia as a by-product in accordance with the reaction formula or equation:

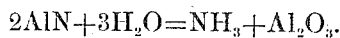

$$2AlN + 3H_2O = NH_3 + Al_2O_3.$$

The alumina thus obtained can be at once employed in the manufacture of aluminum, in which, as is well known only chemically pure alumina can be safely employed.

If the aluminous material contains iron, the latter occurs in the metallic state mixed with the aluminum nitrid. The iron, however, can be easily separated from the nitrid either by means of weak acids or by means of chlorin without injuring the nitrid. The nitrid may also be boiled with water or a weak alkali-solution, in which case ammonia is generated as a by-product and the alumina is obtained in the form of aluminate or alumina respectively, the iron on the other hand remaining undissolved. By means of a suitable magnetic separator the iron can be separated from the nitrid.

The process can even be advantageously applied to materials containing more than 50% of volatile mineral matters, that is to say, clays which could not be employed in the production of alumina according to the previous methods, particularly on account of the disproportionately large consumption of expensive decomposing chemicals (soda, caustic soda).

The heating devices adopted are such as to allow of the lost heat from other processes being advantageously employed, whereby the actual evaporation can be carried on almost entirely in the zone of lost heat, so that only the alumina freed from its "ballast" requires to be exposed to the direct action of the higher temperature.

A preferred form of apparatus for carrying out the above described process is illustrated in the annexed drawing, in which—

Figure 1 is a longitudinal section of a furnace, and Fig. 2 is a cross section of one half of the apparatus taken on the line 2—2 of Fig. 1.

In the drawing, A represents a metallic casing, consisting of iron for instance, B is a lining of refractory brick work, and C is another lining consisting of aluminum nitrid. This second lining is coated on its inner side with a tube or cylinder E consisting of a material which is a conductor of electricity, such as carbon. The electric current is supplied to the said conductor by electrodes F, F which may also consist of carbon or they may be of copper. Gases consisting of, or containing nitrogen may be conveyed through the furnace in any desired manner. Means may be provided (not shown) to turn the whole apparatus around its axis when desired. At the inner side of the said conductor E, projections G may be provided to assist in producing an intimate mixture of the material to be treated.

The ammonia obtained in this process is an important valuable by-product, which contributes substantially to rendering the process profitable.

I claim—

1. The process of removing impurities from impure aluminous material containing silica and producing nitrogen compounds therefrom which comprises mixing such aluminous material with carbon and heating the mixture in the presence of nitrogen to a temperature substantially below that of the electric arc.

2. The process of removing impurities from impure aluminous material containing silica and producing nitrogen compounds therefrom which comprises mixing such aluminous material with carbon and heating the mixture in the presence of nitrogen to a temperature not exceeding 1800° C.

3. The process of removing impurities from impure aluminous material containing silica and producing nitrogen compounds therefrom which comprises mixing such aluminous material with carbon and heating the mixture in the presence of nitrogen to a temperature of about 1600 to 1800° C.

4. The process of treating aluminous material containing impurities capable of forming volatile nitrogen compounds which comprises mixing such aluminous material with carbon and heating the mixture in the presence of nitrogen to a temperature substantially below that of the electric arc.

5. The process of treating aluminous material containing impurities capable of forming volatile nitrogen compounds which comprises mixing such aluminous material with carbon and heating the mixture in the presence of nitrogen to a temperature not exceeding 1800° C.

6. The process of treating aluminous material containing impurities capable of forming volatile nitrogen compounds which comprises mixing such aluminous material with carbon and heating the mixture in the presence of nitrogen to a temperature of about 1600 to 1800° C.

In testimony whereof I affix my signature in presence of two witnesses.

OTTOKAR SERPEK.

Witnesses:
 ALLAN MACFARLANE,
 AUGUSTE JEOY.